(12) United States Patent
Jamal et al.

(10) Patent No.: US 12,340,960 B2
(45) Date of Patent: Jun. 24, 2025

(54) BATTERY POWERED DEVICES

(71) Applicant: Pass & Seymour, Inc., Syracuse, NY (US)

(72) Inventors: Syed J. Jamal, Rochester, NY (US); Richard M. Rohmer, Memphis, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 634 days.

(21) Appl. No.: 17/590,938

(22) Filed: Feb. 2, 2022

(65) Prior Publication Data

US 2022/0246372 A1 Aug. 4, 2022

Related U.S. Application Data

(60) Provisional application No. 63/144,655, filed on Feb. 2, 2021.

(51) Int. Cl.
| | |
|---|---|
| *H01H 23/14* | (2006.01) |
| *G08C 17/02* | (2006.01) |
| *H01H 23/04* | (2006.01) |
| *H02G 3/08* | (2006.01) |
| *H05B 47/19* | (2020.01) |

(52) U.S. Cl.
CPC .......... *H01H 23/145* (2013.01); *G08C 17/02* (2013.01); *H01H 23/04* (2013.01); *H01H 2239/058* (2013.01); *H02G 3/086* (2013.01); *H05B 47/19* (2020.01)

(58) Field of Classification Search
CPC ................. H01H 23/145; H01H 23/04; H01H 2239/058; H01H 9/12; H01H 2300/03; H01H 9/0271; H01H 23/006; H01H 23/08; H01H 23/12; H01H 23/143; H01H 23/30; H01H 23/025; H01H 2221/016; H01H 23/14; H01H 23/168; H01H 2221/018; H01H 23/02; H01H 23/003; H01H 23/146; H01H 23/16; H01H 23/20; H01H 23/28; H01H 23/00; H01H 23/148; H01H 23/24; H01H 23/26; G08C 17/02; H02G 3/086; H02G 3/14; H05B 47/19; H02J 7/0029; H02J 7/0042; H02J 7/0063
See application file for complete search history.

(56) References Cited

U.S. PATENT DOCUMENTS

| | | | |
|---|---|---|---|
| 2017/0257096 A1* | 9/2017 | Lark, Jr. .............. | H03K 17/962 |
| 2018/0122601 A1* | 5/2018 | Wisniewski ......... | H01H 23/145 |
| 2020/0227998 A1* | 7/2020 | King ...................... | H04L 65/60 |
| 2021/0408775 A1* | 12/2021 | Ragland ................ | H01H 23/04 |
| 2022/0115189 A1* | 4/2022 | Gumina ............... | H01H 1/5805 |

\* cited by examiner

*Primary Examiner* — Ahmed M Saeed

(74) *Attorney, Agent, or Firm* — Bond, Schoeneck & King, PLLC; Frederick J. M. Price

(57) ABSTRACT

A wireless smart switch, comprising: an actuator, a circuit assembly, comprising at least a controller, a battery, and a transceiver, the controller being powered by the battery and being programmed to send one or more command signals via the transceiver, according to a user input from the actuator; a back-body, the back-body having a rear surface adapted to be mounted to a surface of a wall or to a wall box; and a ground wire, the ground wire being seated within a recess defined within the rear surface of back-body, the ground wire having a fixed end and a free end such that the free end can be drawn away from the back body and connected to a ground wire within a wall box.

28 Claims, 7 Drawing Sheets

BATTERY POWERED DEVICES

CROSS-REFERENCE TO RELATED APPLICATION

This application claims priority to U.S. Provisional Patent Application No. 63/144,655 filed on Feb. 2, 2021, the entirety of which is incorporated herein by reference.

BACKGROUND

The present invention relates generally to battery powered devices, and particularly to battery powered devices that are structured and configured to communicate with and/or control electrical wiring devices and that can be mounted to a wall or to a wall box.

BRIEF SUMMARY OF THE INVENTION

All examples and features mentioned below can be combined in any technically possible way.

According to an aspect, a smart switch includes: an actuator, a circuit assembly comprising at least a controller, a battery, and a transceiver, the controller being powered by the battery and being programmed to send one or more command signals via the transceiver, according to a user input from the actuator; a back-body, the back-body having a rear surface adapted to be mounted to a surface of a wall or to a wall box; and a ground wire, the ground wire being seated within a recess defined within a rear surface of back-body, the ground wire having a fixed end and a free end such that the free end can be drawn away from the back body and connected to a ground wire within a wall box.

In an example, the smart switch further includes at least one adhesive pad positioned on the rear surface of the back-body such that rear surface can be affixed to a wall.

In an example, the back-body defines a first mounting hole and a second mounting hole dimensioned to receive screws for connection to a wall box.

In an example, the back-body defines threaded apertures, the threaded apertures permitting connection to a wall plate.

In an example, the wall plate is a multi-gang wall plate.

In an example, the actuator is a paddle switch.

In an example, the actuator further includes a slider.

In an example, the command signal is transmitted using a protocol selected from one of: ZigBee, Bluetooth, or Wi-Fi.

In an example, the command signal is sent via at least one intermediate device.

In an example, the command signal is sent to a remote switch.

In an example, the back-body further includes a breakaway tab, wherein the breakaway tab is located at a first end of the back-body, the breakaway tab being separated from a center portion of the back-body.

In an example, the breakaway tab is separated from the center portion of the back-body by a channel, wherein a thickness of the channel is selected to permit the breakaway tab to be separated from the center portion, at the channel, by bending the breakaway tab relative to the center portion.

In an example, the channel has a V-shaped profile.

In an example, the breakaway tab is separated from the center portion of the back-body by a perforated length, wherein the perforated length is configured to permit the breakaway tab to be separated from the center portion, at the perforated length, by bending the breakaway tab relative to the center portion.

In an example, the first end is a top of the back-body.

In an example, the first end is a bottom of the back-body.

In an example, the back-body further includes a second breakaway tab, wherein the second breakaway tab is located at a second end of the back-body, the second breakaway tab being separated from a center portion of the back-body.

In an example, the back-body further includes a second breakaway tab, wherein the second breakaway tab is located at a second end of the back-body and is separated from the center portion of the back-body by a second channel, wherein a thickness of the second channel is selected to permit the second breakaway tab to be separated from the center portion, at the second channel, by bending the second breakaway tab relative to the center portion.

In an example, the back-body further includes a second breakaway tab, wherein the second breakaway tab is located at a second end of the back-body and is separated from the center portion of the back-body by a second perforated length, wherein the second perforated length is configured to permit the second breakaway tab to be separated from the center portion, at the second perforated length, by bending the second breakaway tab relative to the center portion.

In an example, the center portion is dimensioned to fit within a standardized Nema wall plate, wherein a length of the back-body is larger than a standardized Nema wall plate.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Various examples described herein are related to a battery-powered switch capable of wireless communication with remote switches and configured for installation flexibility on the surface of a wall or with a wall box. In certain examples, the installation flexibility is afforded by a ground wire that can be pulled away from a recess in the rear surface of the battery-powered switch and connected to a ground wire in a wall box but can be left in the recess when affixing the battery-powered switch to a wall or other surface. Further, in certain examples, the battery-powered switch can include a back-body with breakaway tabs that permit resizing of the device to fit with standard wall plates or can be left on for use with larger wall plates.

Embodiments of the present invention provide battery powered devices that are structured and configured to communicate with and/or control electrical wiring devices. Electrical wiring devices (as the non-limiting term is used herein, and as should be understood by those of ordinary skill in the art) may be configured as an outlet receptacle or as a protective device, such as a ground fault circuit interrupter (GFCI), an arc fault circuit interrupter (AFCI), a transient voltage surge suppressor (TVSS), or a surge protective device (SPD). Other electrical wiring device examples include switches, dimmers, fan speed controls, night lights, low voltage ports, or USB ports. The electrical wiring devices may also be a smart device or smart version of any of the previously wiring device types. Finally, each of these electrical wiring device types may be found in mix-and-match combinations with other kinds of these wiring devices. For example, a GFCI/AFCI combination device may be included within a single housing.

Figure 1:
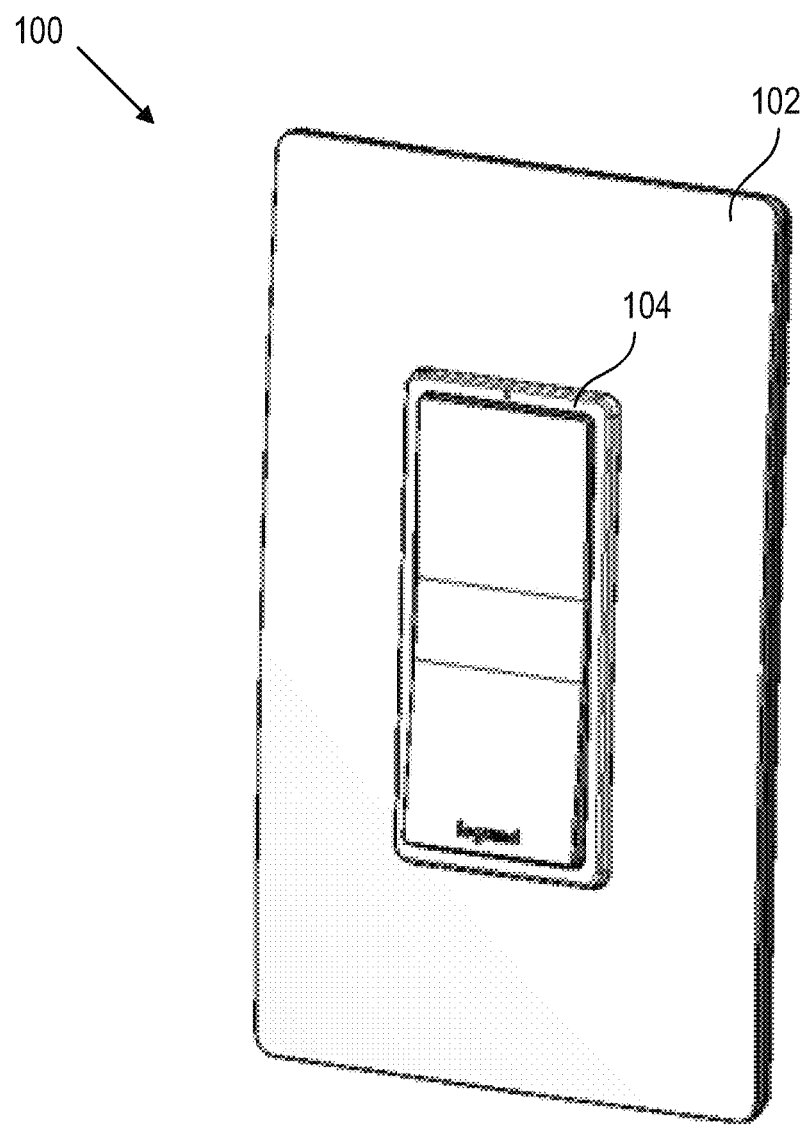
FIG. 1 is a perspective view of a switch assembly, according to an example.

FIG. 1 depicts a schematic view of an example of a switch assembly 100 comprising a wall plate 102 and battery-powered device 104 configured for selective attachment to a wall or wall box and to "connect" to another house/building electrical wiring device(s) (e.g., switch) and control the electrical wiring device(s) via a built-in transmitter/transceiver (where the electrical wiring device has the capability of being communicated with and controlled including, for example, a board with a transceiver and a microprocessor with firmware). For example, battery-powered device 104 can adhere on the wall next to a bed in a bedroom (via, e.g., adhesive tape or screws placed through mounting holes) and wirelessly connect to a main light switch in the bedroom (e.g., near the door) so that a person can control the light without getting out of bed (by actuating the battery powered device switch). No external wires for connection to the electrical wiring device are necessary as the device is battery powered and controls/communicates to the other switch (or multiple switches) via wireless transmission.

Figure 2:
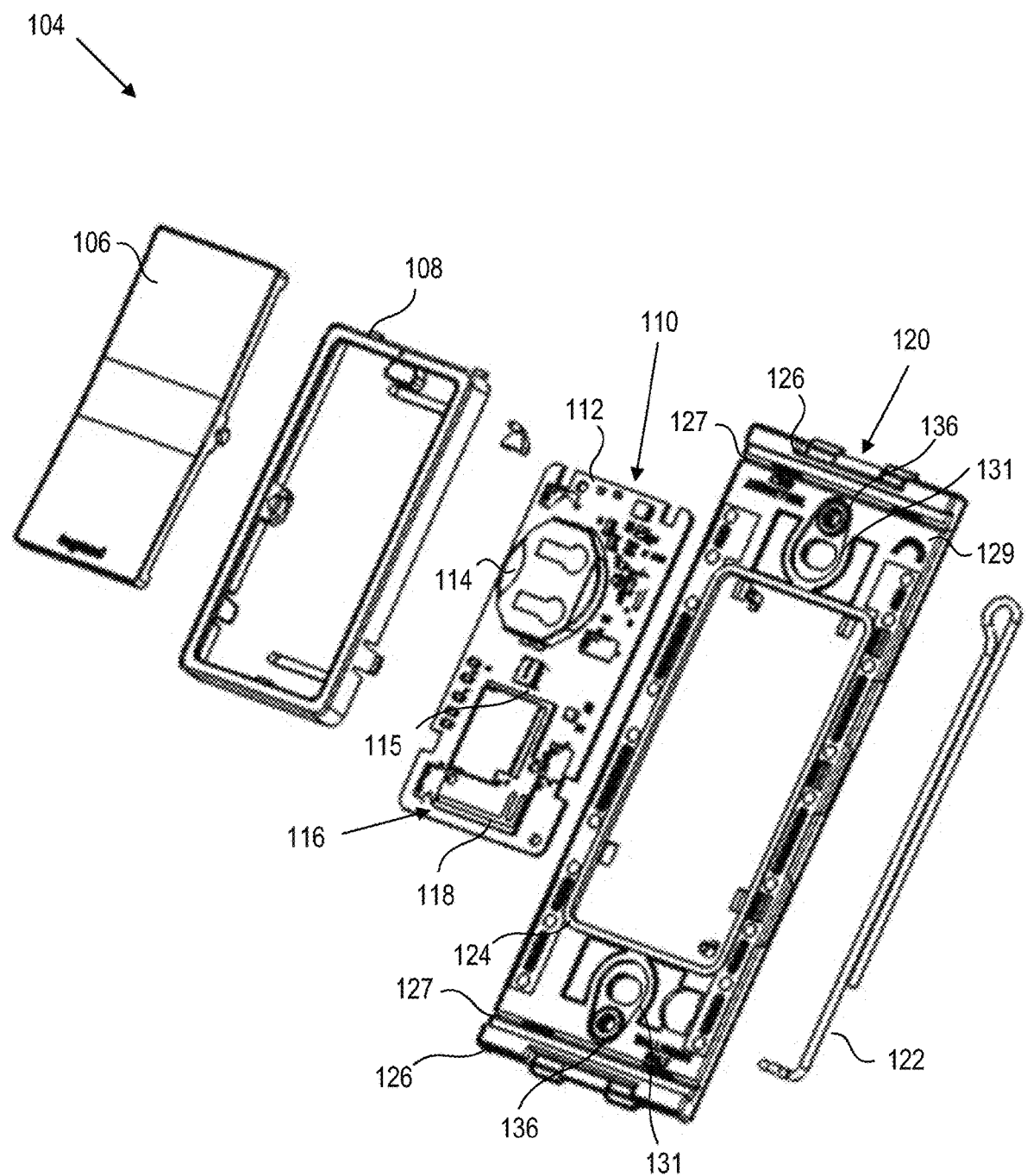
FIG. 2 is a perspective exploded view of a battery-powered device, according to an example.

FIG. 2 depicts an exploded view of an example of battery-powered device 104. Starting on the left side of FIG. 2, battery-powered device 104 can include an actuator 106 (in this example, a paddle switch), mounted to switch frame 108. In alternative examples, actuator 106 can be implemented as any suitable form of switch or slider. As shown in FIG. 6A, and discussed further below, actuator 106 can further include a slider as dimming input. Physical operation of actuator 106 operates electrical circuit assembly 110. Electrical circuit assembly 110 includes a printed circuit board 112, on which is mounted a battery 114 for powering a controller 115. Controller 115 can be implemented as one or more microcontrollers with any associated hardware. Controller 115 is programmed to send one more wireless command signals (e.g., ON/OFF, or a dim setting) via transceiver 116, which includes antenna 118, to a remote device, such as a remote switch, according to the user input from actuator 106.

The wireless command signal be sent through any wireless protocol/technology, including, but not limited to, ZigBee standards-based protocol, Bluetooth technology, and/or Wi-Fi technology. The pairing of battery-powered device 104 with the remote device can be accomplished via known methods. It should be understood that communicating with the remote device can occur through direct communication or through one or more intermediate device, such as through a mesh network or a hub. Electrical switches and dimmer circuits, transceivers, and the remote operation of switches through protocols such as ZigBee, Bluetooth, Wi-Fi, etc., is known in the art, and any suitable smart switch circuit can be used.

Moving further to the right, battery-powered device 104 further includes a back-body 120 and ground wire 122. Back-body 120 includes at the either end (i.e., the top and bottom, according to the orientation when the battery-powered device 104 when installed) a breakaway tab 126. The breakaway tab 126 is separated from the center portion 129 of back-body by a channel 127 of reduced thickness (channel 127, can for example, have V-shaped profile such that its narrowest point is at the center, although other profiles are contemplated). The thickness of channel 127 can be selected maintain the rigidity of back-body 120, but also to permit a user to remove the break-off tabs by bending the breakaway tabs along channel 127. In various alternative examples, breakaway tabs can be made easily removable through other methods, such as slots or perforations disposed along a length of the back-body 120 (e.g., in place of channel 127) designed to relatively weaken a length of back-body 120 so that breakaway tab can be bent and removed.

Breakaway tabs 126 allow a user to resize the back-body 120 to fit with Nema standard-sized wall plate or wall boxes. Stated differently, the center portion 129 of back-body 120 is dimensioned to fit with Nema standard-sized wall plates or wall boxes, but back-body 120 with breakaway tabs 126 is larger than standard, and, for example, works with the Adorne and Radiant lines of wall plates offered by Pass and Seymour, as will be further described below.

Figure 3:
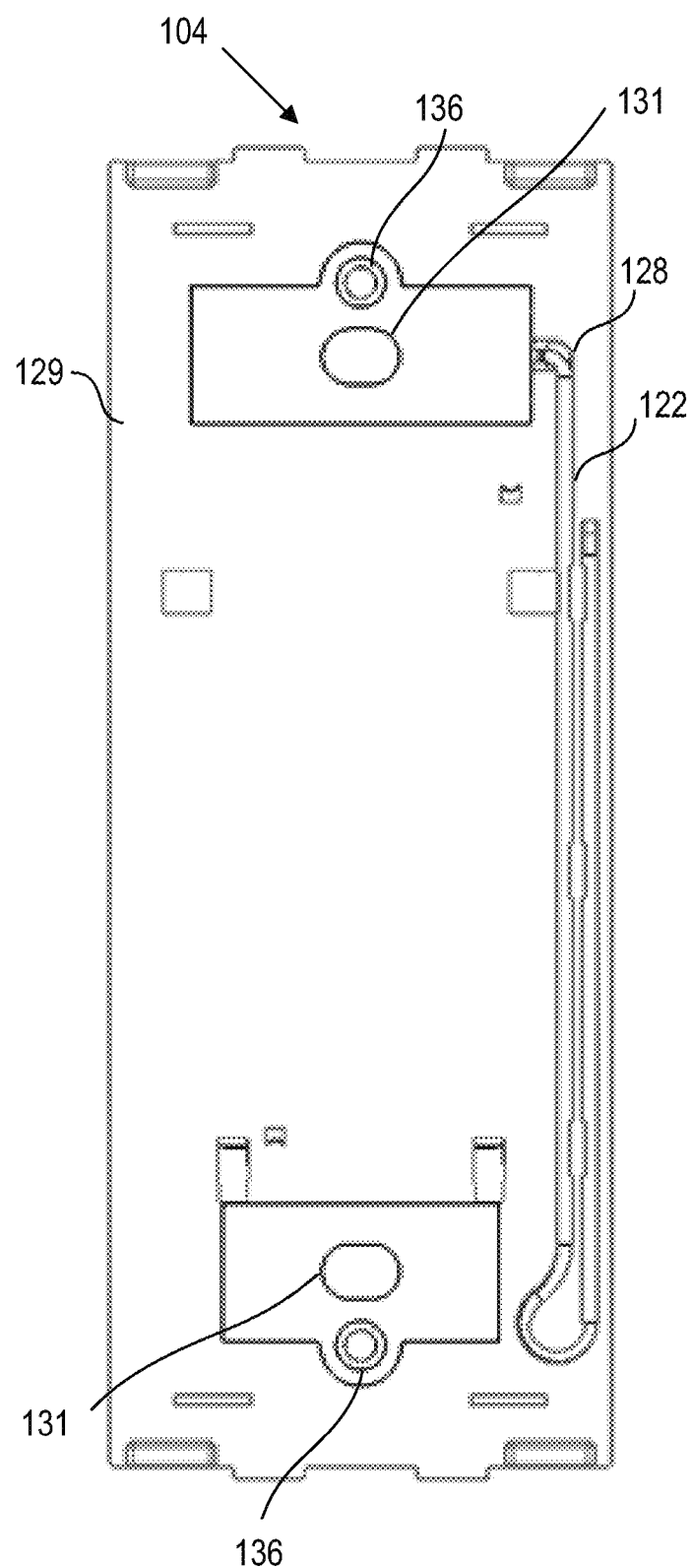
FIG. 3 is a rear view of a back-body of a battery-powered device, according to an example.

FIG. 3 depicts a rear view of back-body 120, showing that ground wire 122 is seated within a recess 124 defined in the rear surface of back-body 120. Ground wire 122 can be bent or looped so as to better fit within along the length or width of back-body 120. Recess 128 houses ground wire 122 so that the rear surface can be made substantially planar, permitting firm adhesive connection to a wall such that through an adhesive pad (e.g., double-sided tape), although other methods of adhesive connection are contemplated. Battery-powered device 104 can also be connected to a wall through mechanical fasteners, e.g., screws, extending through mounting holes 131.

In various examples, battery-powered device 104 can also connect to a wall box or next to a wall box adjacent to another electrical wiring device within a multiple hole wall plate connecting the devices (multi-gang). As such, examples of the battery powered device 104 have installation flexibility and can thus be mounted to a surface (e.g., on wall), box, multi-gang, single-gang, metal wall plate with grounding means.

Figure 4:
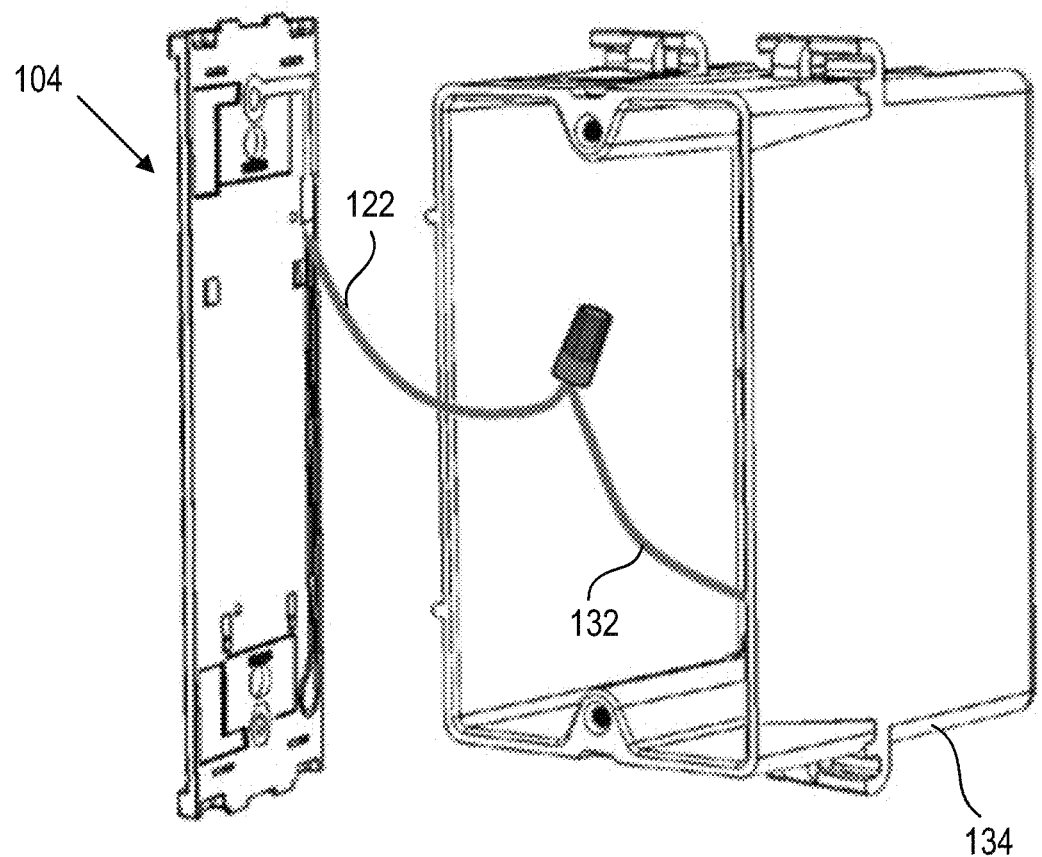
FIG. 4 is a perspective view of switch assembly having a ground wire connected to a ground wire of a wall box, according to an example.

As shown in FIG. 4, when battery-powered device 104 is connected in a wall box, standards require that battery-powered device be grounded. This is required, even if the device is battery powered, to mitigate the dangers of unintended electrification of switch assembly 100 by the wires within the wall box. Ideally, such wires will be properly terminated and tucked into the back of the wall box, so that switch assembly 100 is not exposed to any current-carrying wires. But in the event of an incorrect installation, certain wires could an electrify switch assembly 100. Battery-powered device 104, accordingly, includes a ground wire 122 that is to be connected to the ground wire 132 of the wall box 134, so that any current at switch assembly 100 is shunted in a safe manner to ground.

Ground wire 122 is fixed at a first end in electrical connection with the negative terminal of battery 114 and free at a second end such that ground wire 122 can be pulled away from the remainder of battery powered device 104 and electrically connected to the ground wire within the wall box. Ground wire 122 need only be used when battery-powered device 104 is installed in a wall box. When battery-powered device, is, in the alternative, affixed to the wall, ground wire 122 can remain seated within recess 128 such that ground wire 122 does not create an uneven surface that would interfere with mounting the rear surface to a wall.

As described above, battery-powered device 104 can be used with single or multi-gang wall plates. Nema sized wall plates can be fastened to the battery-powered device via screws received through threaded mounting holes 136. Battery-powered device 104 can also be used with a larger wall plate, such as a wall plate from the Radiant or Adorne line of products offered by Pass and Seymour. In this case, the wall plate can affixed to the battery-powered device via a subframe that attaches to the battery-powered device 104 via screws received through mount holes. The wall plate then attaches to the subframe. The structure and method for attaching a wall plate via a subframe is described in more detail in U.S. Pat. No. 10,270,235 titled "Modular Electrical Wiring Device System," and in US 2020/00185898 titled "Modular electrical wiring device assemblies," both of which are fully incorporated by reference herein.

Figure 5:
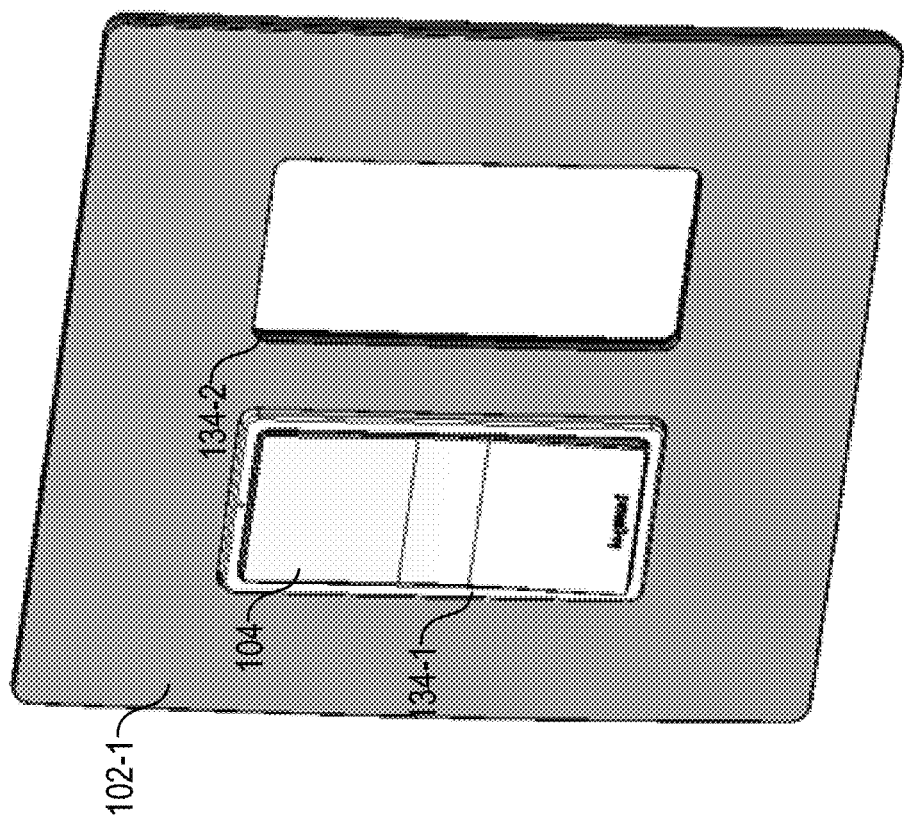
FIG. 5 is a perspective view of switch assembly including multi-gang wall plate with a battery-powered device, according to an example.

FIG. 5 depicts the multi-gang wall plate 102-1. As shown, one opening 134-1 of the multi-gang wall plate 102-1 is used for the battery-powered device 104. The multi-gang wall plate 102-1 has a separate opening 134-2 for a different battery-powered device or for a wired electrical device. In the latter case, the battery powered device can be affixed to the wall next to a wall box in which the electrical wiring device is installed. Alternatively, the battery powered device can be mounted to a multi-gang wall box.

Figure 6C:
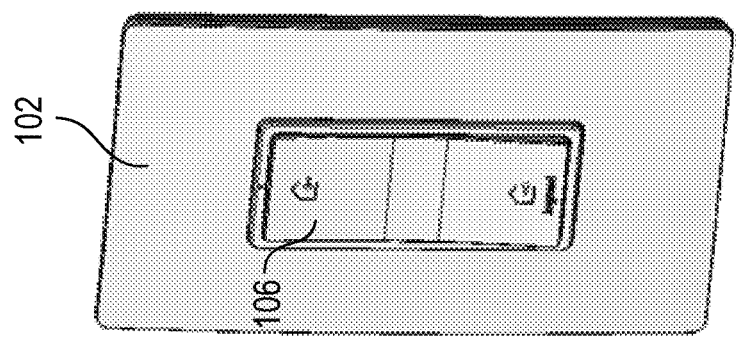
FIG. 6C is a perspective of view of a switch assembly, according to an example.
Figure 6B:
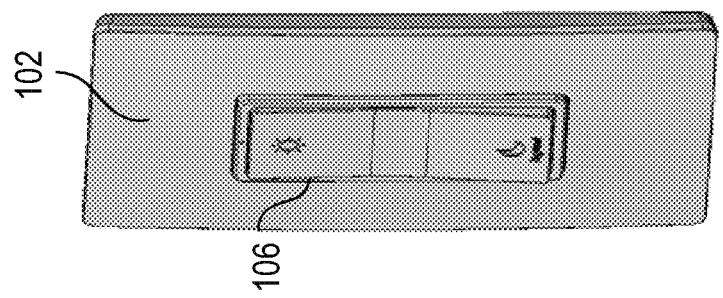
FIG. 6B is a perspective of view of a switch assembly, according to an example.
Figure 6A:
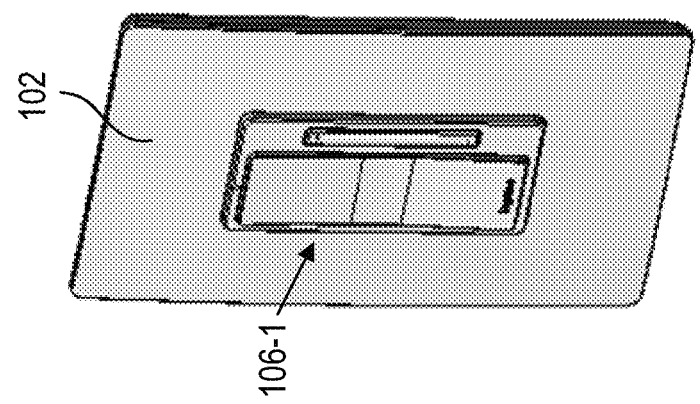
FIG. 6A is a perspective of view of a switch assembly, according to an example.
Figure 6E:
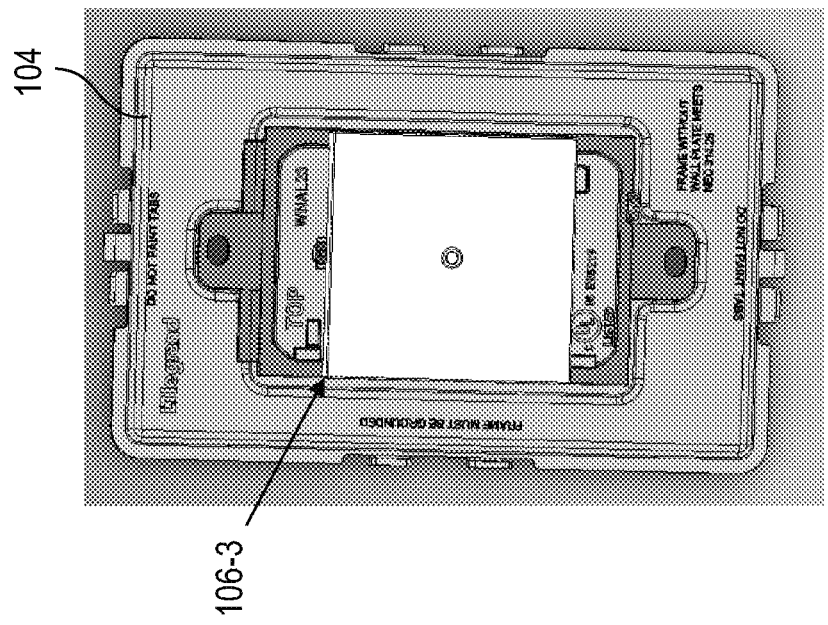
FIG. 6E is a perspective of view of a battery-powered device, according to an example.
Figure 6D:
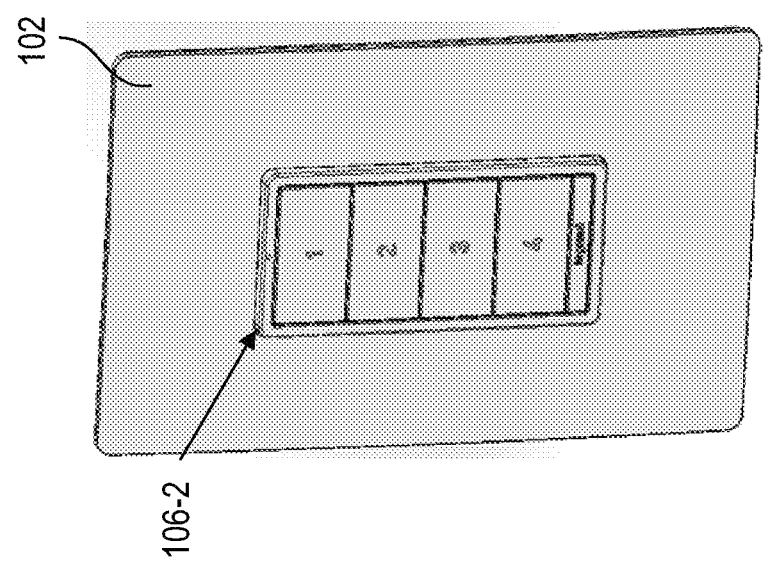
FIG. 6D is a perspective of view of a switch assembly, according to an example.

FIGS. 6A-6E depict alternative examples of switch assembly 100, featuring different actuators 106 and functions of battery-powered device 104. In the example of FIG. 6A actuator 106-1 is implemented as paddle switch with a slider for dimming. In FIG. 6B, the actuator 106 is a paddle switch that implements a wake/sleep function for a home. In FIG. 6C, the actuator 106 is a paddle switch that implements a home/away function for a home. In the example of FIG. 6D, the actuator 106-2 is a set of switches that can be used to implement various dim levels or preset values. In the example of FIG. 6E, the battery-powered device includes as actuator 106-3 a touch-sensitive button that can receives user inputs to implement various dim levels or preset values. It will be understood that other types of actuators and other functions are contemplated to be used with battery-powered device 104. For example, the command signals can be used to adjust the color mixing of color temperature or color adjustable lights, to adjust the temperature of a thermostat, to lock smart doors, and so on.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A wireless smart switch, comprising:
    an actuator,
    a circuit assembly, comprising at least a controller, a battery, and a transceiver, the controller being powered by the battery and being programmed to send one or more command signals via the transceiver, according to a user input from the actuator;
    a back-body, the back-body having:
        a rear surface adapted to be mounted to a surface of a wall or to a wall box, and
        a breakaway tab, wherein the breakaway tab is located at a first end of the back-body, the breakaway tab being separated from a center portion of the back-body by a channel, wherein a thickness of the channel is selected to permit the breakaway tab to be separated from the center portion, at the channel, by bending the breakaway tab relative to the center portion; and
    a ground wire, the ground wire being seated within a recess defined within a rear surface of back-body, the ground wire having a fixed end and a free end such that the free end can be drawn away from the back body and connected to a ground wire within a wall box.

2. The smart switch of claim 1, further comprising at least one adhesive pad positioned on the rear surface of the back-body such that rear surface can be affixed to a wall.

3. The smart switch of claim 1, wherein the back-body defines a first mounting hole and a second mounting hole dimensioned to receive screws for connection to a wall box.

4. The smart switch of claim 1, wherein the back-body defines threaded apertures, the threaded apertures permitting connection to a wall plate.

5. The smart switch of claim 4, wherein the wall plate is a multi-gang wall plate.

6. The smart switch of claim 1, wherein the actuator is a paddle switch.

7. The smart switch of claim 6, wherein the actuator further includes a slider.

8. The smart switch of claim 1, wherein the command signal is transmitted using a protocol selected from one of: ZigBee, Bluetooth, or Wi-Fi.

9. The smart switch of claim 1, wherein the command signal is sent via at least one intermediate device.

10. The smart switch of claim 1, wherein the command signal is sent to a remote switch.

11. The wireless smart switch of claim 1, wherein the channel has a V-shaped profile.

12. The wireless smart switch of claim 1, wherein the breakaway tab is separated from the center portion of the back-body by a perforated length, wherein the perforated length is configured to permit the breakaway tab to be separated from the center portion, at the perforated length, by bending the breakaway tab relative to the center portion.

13. The wireless smart switch of claim 1, wherein the first end is a top of the back-body.

14. The wireless smart switch of claim 1, wherein the first end is a bottom of the back-body.

15. The wireless smart switch of claim 1, wherein the back-body further includes a second breakaway tab, wherein the second breakaway tab is located at a second end of the back-body, the second breakaway tab being separated from a center portion of the back-body.

16. The wireless smart switch of claim 1, wherein the back-body further includes a second breakaway tab, wherein the second breakaway tab is located at a second end of the back-body and is separated from the center portion of the back-body by a second channel, wherein a thickness of the second channel is selected to permit the second breakaway tab to be separated from the center portion, at the second channel, by bending the second breakaway tab relative to the center portion.

17. The wireless smart switch of claim 1, wherein the back-body further includes a second breakaway tab, wherein the second breakaway tab is located at a second end of the back-body and is separated from the center portion of the back-body by a second perforated length, wherein the second perforated length is configured to permit the second breakaway tab to be separated from the center portion, at the second perforated length, by bending the second breakaway tab relative to the center portion.

18. The smart switch of claim 1, wherein the center portion is dimensioned to fit within a standardized Nema wall plate, wherein a length of the back-body is larger than a standardized Nema wall plate.

19. A wireless smart switch, comprising:
    an actuator, wherein the actuator includes a rocker switch,
    a circuit assembly, comprising at least a controller, a battery, and a transceiver, the controller being powered by the battery and being programmed to send one or more command signals via the transceiver, according to a user input from the actuator; and
    a back-body, the back-body having:

a rear surface adapted to be mounted to a surface of a wall or to a wall box, wherein the back-body defines a first mounting hole and a second mounting hole spaced and dimensioned to receive screws for connection to the wall box; and a breakaway tab, wherein the breakaway tab is located at a first end of the back-body, the breakaway tab being separated from a center portion of the back-body by a channel, wherein a thickness of the channel is selected to permit the breakaway tab to be separated from the center portion, at the channel, by bending the breakaway tab relative to the center portion.

20. The smart switch of claim 19, further comprising at least one adhesive pad positioned on the rear surface of the back-body such that rear surface can be affixed to a wall.

21. The smart switch of claim 19, wherein the back-body defines threaded apertures, the threaded apertures permitting connection to a wall plate.

22. The smart switch of claim 21, wherein the wall plate is a multi-gang wall plate.

23. The smart switch of claim 19, wherein the rocker switch is a paddle switch.

24. The smart switch of claim 23, wherein the actuator further comprises a dimmer switch.

25. The smart switch of claim 19, wherein the command signal is transmitted using a protocol selected from one of: ZigBee, Bluetooth, or Wi-Fi.

26. The smart switch of claim 19, wherein the command signal is sent via at least one intermediate device.

27. The smart switch of claim 19, wherein the command signal is sent to a remote switch.

28. The smart switch of claim 24, wherein the dimmer switch is a dimmer slider switch.

* * * * *